Patented June 19, 1945

2,378,779

UNITED STATES PATENT OFFICE 2,378,779

DYESTUFF INTERMEDIATE PRODUCTS

Hans Loleit, Dessau, and Gustav Wilmanns, Wolfen, Kreis Bitterfeld, Germany, assignors, by mesne assignments, to General Aniline & Film Corporation, New York, N. Y., a corporation of Delaware No Drawing. Application July 13, 1939, Serial No. 284,258. In Germany July 16, 1938

12 Claims. (Cl. 260—397.1)

This invention relates to dyestuff intermediate products and more particularly to intermediate products for azo-, quinonimine- and azomethine dyestuffs. For the purpose of dyeing these intermediate products are coupled with diazo-compounds or jointly oxidized with phenylenediamine, aminophenols or the like, or caused to react with nitroso-compounds which are derived from secondary or tertiary aromatic amines or phenols. In photography use is made of the property of such intermediate products of forming dyestuffs by the silver picture when the silver halide emulsion is developed with special developers. They can also be used in producing color pictures by azo-coupling.

It is an object of the invention, therefore to provide novel dyestuff components.

Another object of the invention resides in the provision of new color-forming development components which are fast to diffusion.

Still further objects will appear from the detailed specification following hereinafter.

This invention relates to a process of dehydrating a bile acid containing hydroxyl radicals and causing the product to react by way of the acid chloride with a dyestuff component containing an amino-group. For this purpose the hydroxyl groups are eliminated from the bile acid containing them by means of heat, the acid chloride is prepared from this unsaturated product and the chloride is then caused to react in the presence of an alkaline condensing agent with the dyestuff component containing at least one free amino-group.

For the use as dyestuff components those suitable for the production of azo-, quinonimine- and azomethine dyestuffs are of outstanding importance. As suitable dyestuffs components may be named, for example, anilines, naphthylamines, aminophenols, aminonaphthols, aminohydroxydiphenyls, compounds having active methylene- and methyl-groups, for instance pyrazolones, acetic acid ester derivatives, isoxazolones, cumaranones, oxindols, cyanoacetophenones and other dyestuff formers proposed for color development, for example, those described in U. S. patents to Fischer, No. 1,055,155 and No. 1,102,027. These dyestuff components may contain any desired substituents, for example, halogen, alkyl, aralkyl, aryl, sulfo- or carboxyl radicals. However, there must be present in the molecule at least one position capable of coupling. The most important of the phenols and naphthols are those compounds in which the position ortho or para to the hydroxyl group is either unsubstituted or contains a negative group, for instance a halogen or a sulfo-group capable of being eliminated during the coupling. The following components may be named for example: meta-aminophenol, 1-hydroxy-3-amino-4-methylbenzene, 5-aminoresorcinol, salicylyl-para-aminoanilide, 1-amino-5-naphthol, 1-hydroxy-2-naphthoyl-para-aminoanilide, 3-hydroxy-4-aminodiphenyl, 4:4'-di-amino-3:3'-dihydroxydiphenyl, acetoacetic acid-para-aminoanilide, monoacetoacetic acid benzidide, para-aminobenzoylacetic acid anilide-para'-carboxylic acid (which is obtained by condensation of para-nitrobenzoylacetic ethyl ester and para-aminobenzoic acid and subsequent reduction of the nitro-group to the amino-group), 1:3'-amino-5'-sulfophenyl-3-methyl-5-pyrazolone, 1:3'-aminophenyl-3-methyl-5-pyrazolone, 1:3'-amino-5'-sulfophenyl-3:4''-aminophenyl-5-pyrazolone. However, the invention is not limited to the named examples, for any component may be used which has a tendency to form azo-, quinonimine- or azomethine dyestuffs. As will be obvious from the foregoing examples, the amino-group necessary for union with the bile acid need not be directly situated on the radical having the coupling position but may be united with the said radical through a further aromatic, aliphatic, araliphatic radical, for instance phenyl, diphenyl, stilbene or the like.

Among bile acids containing hydroxyl are included all derivatives of the cyclopentanoperhydrophenanthrene containing a hydroxyl group in addition to the carboxyl group, for instance, cholic acid, desoxycholic acid, apocholic acid, lithocholic acid, β-3-hydroxy-bis-norcholonic acid or the like. It is not, however, necessary to isolate the pure bile acids, since the mixture may be used which occurs in galls, for instance ox-gall or pig-gall. Under some conditions even a separation of the fatty acids from this mixture need not be undertaken. Also choleic acids may be used. It is also possible to use taurocholic acid and glycocholic acid, as well as mixtures of these with fatty acids.

The hydroxyl groups may be eliminated from the above acids, preferably by heating them in a water pump vacuum (10–100 mms.) to about 150–300° C. The vacuum may, however, vary between wide limits, the temperature being correspondingly changed. When using mixed and pure acids especially good results are obtained under a pressure of 10–60 mms. and at a temperature of 200–280° C. Thus, from cholic acid there may be formed cholatrienic acid (Zeitschrift für physiol. Chem. (Hoppe-Seyler) 80, page 287, (1912), from desoxycholic acid choladienic acid (Zeitschrift für physiol. Chem. (Hoppe-Seyler) 98, page 59 (1916)), from lithocholic acid cholenic acid (Zeitschrift für physiol. Chem. (Hoppe-Seyler) 110, page 136 (1920)). The unsaturated acids thus produced may be isolated by distillation. However, it is often preferable for the sake of simplicity to heat the acid containing hydroxyl only until the main portion of the water has been eliminated and to use this product directly for making the acid halide. Such a process may also be used for example in treating mixed bile acids such as are obtained for example from ox-gall or pig-gall or the like. Even when a mixture of bile acids from which the fatty acids have not been separated is to be used as the raw material, this process may be applied.

The halides of these acids are obtained by means of the known halogenating agents, for example, thionyl chloride, phosphorus trichloride, phosphorus tribromide, phosphorus pentachloride with or without the use of a solvent, for instance, benzene, ether or chloroform.

The bile acid chloride is condensed with the amino-groups of the dyestuff component, preferably by use of an alkaline condensing agent, for instance pyridine, piperidine or trimethylamine, at ordinary or raised temperature. Alkali carbonate or alkali hydroxide may also be used, but they necessitate a tedious working up of the product of the reaction.

The intermediate products obtained by the invention are very valuable for various purposes in the dyeing industry. They are especially suitable for producing silver halide emulsion layers which are used in color photography. For this purpose the silver halide emulsions prepared with the dyestuffs may be made into multi-layer photographic material. The production of the color picture may be by means of color development, oxidation or azo-coupling.

The following examples illustrate the invention:

Example 1

Cholic acid is heated to 260° C. in a water pump vacuum, whereby it is largely dehydrated. After cooling the product is dissolved in benzene and there is added in drops at room temperature phosphorus trichloride in a proportion of 2:1 by weight. The reaction is completed by gentle heating on the water bath. The chloride thus obtained is either precipitated by cautious addition of benzine or the original solution is used directly for further reaction. Somewhat more than $1/20$ mol of the chloride is added to a solution of a $1/20$ mol of para-aminobenzoyl-acetanilide-para'-carboxylic acid in pyridine at 70° C. The end of the reaction may be detected by the fact that a test portion no longer gives the azo-reaction. The product is now isolated by pouring the solution on to ice.

Example 2

A benzene solution of somewhat more than $1/20$ of a mol of the acid chloride obtained as described in Example 1 is added by drops to a boiling solution of $1/20$ of a mol of 1-(3'-amino-5'-sulfophenyl)-3-methyl-5-pyrazolone in pyridine while the benzene is distilled. The product is isolated by pouring the mass into a mixture of ice and common salt.

Example 3

A benzene solution of somewhat more than $1/20$ of a mol of the acid chloride obtained as described in Example 1 is added by drops to a solution kept at 100° C. of 1-hydroxy-2-naphthoyl-para-aminoanilide in pyridine while the benzene is simultaneously distilled. The product is isolated by pouring the mass on to ice; by heating it with concentrated sulfuric acid at 40° C. it may be sulfonated and the sulfonated product may be isolated by pouring the mass on ice.

Example 4

Desoxycholic acid is converted into choladienic acid and the latter is converted into the chloride in the manner described in Example 1. $1/20$ of a mol of this chloride dissolved in benzene is added by drops to a boiling solution of $1/40$ of a mol of 1-(3'-aminophenyl)-3-(4'-aminophenyl)-5-pyrazolone in pyridine while simultaneously distilling the benzene, and the product is isolated by pouring the mass into a mixture of ice and hydrochloric acid.

Example 5

The mixture of bile acids obtained after separating the fatty acids from ox-gall is dehydrated by heating it to about 240-280° C. in a water pump vacuum. The product is converted into the chlorides in the manner described in Example 1 and this mixture is caused to react in the manner described in Example 2 with 1-(3'-amino-5'-sulfophenyl)-3-methyl-5-pyrazolone.

Example 6

The mixture of bile acids containing fat and obtained from ox-gall is heated at about 240-280° C in a water pump vacuum. This dehydrated product is chlorinated by means of an excess of thionyl chloride, and the mixture of acid chlorides is added little by little to a boiling solution of 1-(3'-amino-5'-sulfophenyl)-3-methyl-5-pyrazolone in pyridine in such quantity that a test portion no longer yields the azo-reaction. The product is then isolated by pouring the mass into a mixture of ice and hydrochloric acid.

We claim:

1. The process which comprises dehydrating a bile acid containing a hydroxyl group, converting the acid into the acid chloride and condensing said acid chloride with an amine in which the amino-group is attached to a dyestuff forming group capable of coupling with a second component to form a dyestuff of the class consisting of azo-, azomethine- and quinonimine dyes.

2. The process which comprises dehydrating a bile acid containing a hydroxyl group, converting the acid into the acid chloride and condensing said acid chloride in the presence of an alkaline condensing agent with an amine in which the amino-group is attached to a dyestuff forming group capable of coupling with a second component to form a dyestuff of the class consisting of azo-, azomethine- and quinonimine dyes.

3. The process which comprises dehydrating a bile acid containing a hydroxyl group, converting the acid into the acid chloride and condensing said acid chloride in the presence of an organic base with an amine in which the amino-group is attached to a dyestuff forming group capable of coupling with a second component to form a dyestuff of the class consisting of azo-, azomethine- and quinonimine dyes.

4. The process which comprises dehydrating a mixture of hydroxy-containing bile acids, chlorinating said mixture to yield chlorides of said bile acids and condensing the mixture of bile acid chlorides in the presence of an organic base with an amine in which the amino-group is attached to a dyestuff forming group capable of coupling with a second component to form a dyestuff of the class consisting of azo-, azomethine- and quinonimine dyes.

5. The process claimed in claim 4 wherein the mixture of hydroxy-containing bile acids also contains higher fatty acids.

6. An acid amide of an unsaturated bile acid obtained by dehydrating a bile acid containing at least one hydroxy group, the amino-group of said acid amide being attached to a dyestuff forming group capable of coupling with a second component to form a dyestuff of the class consisting of azo-, azomethine- and quinonimine dyes.

7. The amide of the unsaturated bile acid obtained by dehydrating cholic acid in vacuo at about 260° C., with an amine in which the amino-group is linked to an atom in the molecular system of a color-forming development component.

8. The acid amide of choladienic acid with an amine in which the amino-group is linked to an atom in the molecular system of a color-forming development component.

9. The mixture of acid amides of the bile acids of ox-gall deyhdrated by heating to about 240– about 280° C. in vacuo, the amino-groups of said amides being attached to rings in the molecular system of color-forming development components.

10. The acid amide of dehydrated cholic acid and p - aminobenzoylacetanilide - p' - carboxylic acid.

11. The acid amide of dehydrated cholic acid and 1-(3'-amino-5'-sulfophenyl)-3-methyl-5-pyrazolone.

12. The mixture of amides of the acids obtained by dehydrating the bile acids of ox gall at about 240 to 280° C. in vacuo with 1-(3'-amino-5-sulfophenyl)-3-methyl-5-pyrazolone.

HANS LOLEIT.
GUSTAV WILMANNS.